(12) United States Patent
Dressel et al.

(10) Patent No.: US 10,555,403 B2
(45) Date of Patent: Feb. 4, 2020

(54) SYSTEM, METHOD, APPARATUS, AND PROGRAM FOR LIGHT TOWER CONTROL

(71) Applicant: HERC RENTALS INC., Bonita Springs, FL (US)

(72) Inventors: Bruce Dressel, Bonita Springs, FL (US); Sunil Gupta, Bonita Springs, FL (US); Matthew Gavin, Bonita Springs, FL (US)

(73) Assignee: HERC RENTALS INC., Bonita Springs, FL (US)

( * ) Notice: Subject to any disclaimer, the term of this patent is extended or adjusted under 35 U.S.C. 154(b) by 0 days.

(21) Appl. No.: 16/111,925

(22) Filed: Aug. 24, 2018

(65) Prior Publication Data

US 2019/0069378 A1 Feb. 28, 2019

Related U.S. Application Data

(60) Provisional application No. 62/549,505, filed on Aug. 24, 2017.

(51) Int. Cl.
*H05B 37/02* (2006.01)
*H04L 29/06* (2006.01)

(52) U.S. Cl.
CPC ......... *H05B 37/0245* (2013.01); *H04L 69/16* (2013.01)

(58) Field of Classification Search
CPC ............................ H05B 37/0245; H04L 69/16
USPC ....................................................... 315/129
See application file for complete search history.

(56) References Cited

U.S. PATENT DOCUMENTS

| 9,655,217 | B2 | 5/2017 | Recker |
| 9,713,222 | B2 | 7/2017 | Bewick et al. |
| 9,964,982 | B1 | 5/2018 | Nguyen et al. |
| 9,980,353 | B2 | 5/2018 | Zhang et al. |
| 10,034,342 | B2 | 7/2018 | Adams et al. |
| 10,034,359 | B2 | 7/2018 | Recker et al. |
| 2011/0257881 | A1* | 10/2011 | Chen .................... G01C 21/362 701/465 |

(Continued)

OTHER PUBLICATIONS

Mokji, Musa Mohd, S. Saleh, and K. Bin Ismail. Design and Development of Street Light Monitoring and Management System. Universiti Teknologi Malaysia, 2006, 157 pages, http://eprints.utm.my/id/eprint/id/eprint/2944/contents.

*Primary Examiner* — Don P Le
(74) *Attorney, Agent, or Firm* — Ladas & Parry LLP (57) ABSTRACT

A method, system, apparatus, and program for scheduling and controlling light towers in the field and receiving detailed reports relating to the same. The system for light tower control includes a telematics platform, a telematics device, and a light tower. The telematics platform is configured to transmit and receive a UDP message over a cellular network, wherein a transmitted UDP message contains a control signal for turning ON or OFF a light tower. The telematics device is configured to receive the UDP message and configure a voltage output of the telematics device based on the control signal. If the control signal is ON the voltage output of the telematics device is changed from Low to High and if the control signal is OFF the voltage output of the telematics device is changed from High to Low. A relay controller of the light tower turns the light tower ON if the output voltage of the telematics device is High and turns the light tower OFF if the output voltage of the telematics device is Low.

20 Claims, 10 Drawing Sheets (56) References Cited

U.S. PATENT DOCUMENTS

| | | | |
|---|---|---|---|
| 2014/0239817 A1* | 8/2014 | Leinen | H05B 37/02 |
| | | | 315/152 |
| 2016/0014873 A1* | 1/2016 | Bello | H05B 37/0227 |
| | | | 315/149 |
| 2017/0050561 A1* | 2/2017 | Lickfelt | H05B 33/0863 |

* cited by examiner

LIGHT TOWER SUMMERY

Dashboard    ON/OFF Scheduler

Search by Profile Name, Branch ID

Create Scheduler Profile

| Profile Name ▲ | No. of Branches | No. of Equipments ▲ | Date Range ▲ | ON Time ▲ | OFF Time ▲ | Last Updated By ▲ | Status ▲ | Actions |
|---|---|---|---|---|---|---|---|---|
| Farmingdale 15th June Profile 4... | 1 | 17 | 06-15-2017 - 07-15-2017 | 8:00PM EST | 7:00AM EST | sandhya.sandala | In Progress | |
| Newark 15th June Profile 4 for 2... | 1 | 21 | 06-15-2017 - 07-15-2017 | 8:00PM EST | 7:00AM EST | sandhya.sandala | In Progress | |
| Astoria 15th June Profile 4 for 2... | 1 | 22 | 06-15-2017 - 07-15-2017 | 8:00PM EST | 7:00AM EST | sandhya.sandala | In Progress | |
| Farmingdale 13th June Profile 3... | 1 | 20 | 06-13-2017 - 07-13-2017 | 8:00PM EST | 7:00AM EST | sandhya.sandala | In Progress | |
| Newark 13th June Profile 3 for 1... | 1 | 13 | 06-13-2017 - 07-13-2017 | 8:00PM EST | 7:00AM EST | sandhya.sandala | In Progress | |
| Astoria 13th June Profile 3 for 14... | 1 | 14 | 06-13-2017 - 07-13-2017 | 8:00PM EST | 7:00AM EST | sandhya.sandala | In Progress | |
| Farmingdale 12th June Profile f... | 1 | 10 | 06-12-2017 - 07-12-2017 | 8:00PM EST | 7:00AM EST | sandhya.sandala | In Progress | |
| Astoria 9th June Profile 2 for 14... | 1 | 14 | 06-09-2017 - 07-09-2017 | 8:00PM EST | 7:00AM EST | sandhya.sandala | In Progress | |
| Newark 9th June Profile 2 for 7... | 1 | 7 | 06-09-2017 - 07-09-2017 | 8:00PM EST | 7:00AM EST | sandhya.sandala | In Progress | |

SYSTEM, METHOD, APPARATUS, AND PROGRAM FOR LIGHT TOWER CONTROL

CROSS-REFERENCE TO RELATED APPLICATION

This application claims the benefit of U.S. Provisional Patent Application Ser. No. 62/549,505, filed on Aug. 24, 2017, the entire contents of which are incorporated herein by reference.

BACKGROUND OF THE INVENTION

Field of the Invention

The present invention generally relates to a method, system, apparatus, and program for light tower control, and more particularly to an improved method, system, apparatus, and program for scheduling and controlling light towers in the field and receiving detailed reports relating to the same.

Related Art

Various industrial sectors often involve demanding and challenging night time operations in order to complete their projects on or before a scheduled time. Because of this there is a need to utilize light towers to provide well-lit areas at night. However, and particularly when there are many light towers—but even when there are only a small number of them—it becomes difficult and tedious for workers to turn them on and off as needed. It is also difficult to know whether one or more of the light towers has a failure condition or the like. With hundreds of light towers or more in a particular field these problems are exacerbated.

SUMMARY OF THE INVENTION

The foregoing and other problems are overcome by an improved method for light tower automation and control, and also by a system, apparatus, and program that operate in accordance with the method. With the present invention various problems are solved and the present invention provides the ability to turn light towers on and off at particular times and to know if a specific light tower is failing or has failed. This can improve efficiency and productivity while reducing cost. The present invention can do these tasks remotely and monitor the codes to come out of the light tower.

The light tower automation system and method of the present invention according to one embodiment comprises the use of a telematics platform to send User Datagram Protocol (UDP) messages over a cellular network (e.g., AT&T) to a telematics device that is integrated with or installed on a light tower, to control the ON/OFF functionality of the light tower.

Overall, the system and method of the present invention controls one or more light towers and indeed can control many light towers (e.g., 490 light towers in one example embodiment) by means of a scheduler, wherein a user is able to program an ON time, OFF time, a reoccurrence pattern, and a length of that pattern via the telematics platform. Access to the scheduler can be controlled by double authentication. Other security and authentication techniques are of course readily envisioned for controlling and authorizing access to the scheduler. The telematics platform also provides a dashboard to view the current status of all of the light towers including details on alerts and to enable control of the light towers. The platform also provides detailed reports on such items including utilization, alerts, exceptions, etc., which can be downloaded in MS Excel or PDF format or others.

The invention according to one aspect provides a system for light tower control comprising a telematics platform, configured to transmit and receive a UDP message over a cellular network, wherein a transmitted UDP message contains a control signal for turning ON or OFF a light tower. The system also comprises a telematics device, configured to receive the UDP message and configure a voltage output of the telematics device based on the control signal. If the control signal is ON the voltage output of the telematics device is changed from Low to High and if the control signal is OFF the voltage output of the telematics device is changed from High to Low.

The invention according to another aspect provides a telematics platform for light tower control comprising a scheduling unit configured to create an ON/OFF schedule for a light tower unit. The system also comprises a control unit configured to determine whether the light tower unit is scheduled to be ON or OFF based on the schedule and create a control signal based thereon. A network interface is configured to transmit a message over a cellular network which contains the control signal for turning ON or OFF the light tower.

The invention according to another aspect provides a method for controlling one or more equipments. The method includes the steps of creating an ON/OFF schedule for each equipment and determining whether a particular equipment unit should be sent an ON/OFF signal. The method further includes the step of creating, when a particular equipment is scheduled to be ON, a message instructing a telematics device to change the voltage output from Low to High; or creating, when a particular equipment is scheduled to be OFF, a message instructing the telematics device to change the voltage output from High to Low. The invention further includes the step of transmitting the message to the telematics device. The equipment may be a light tower unit. The message may be a UDP message.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

An example embodiment of the invention provides an improved method for light tower automation, and also a system, apparatus, and program that operate in accordance with the method.

Figure 1:
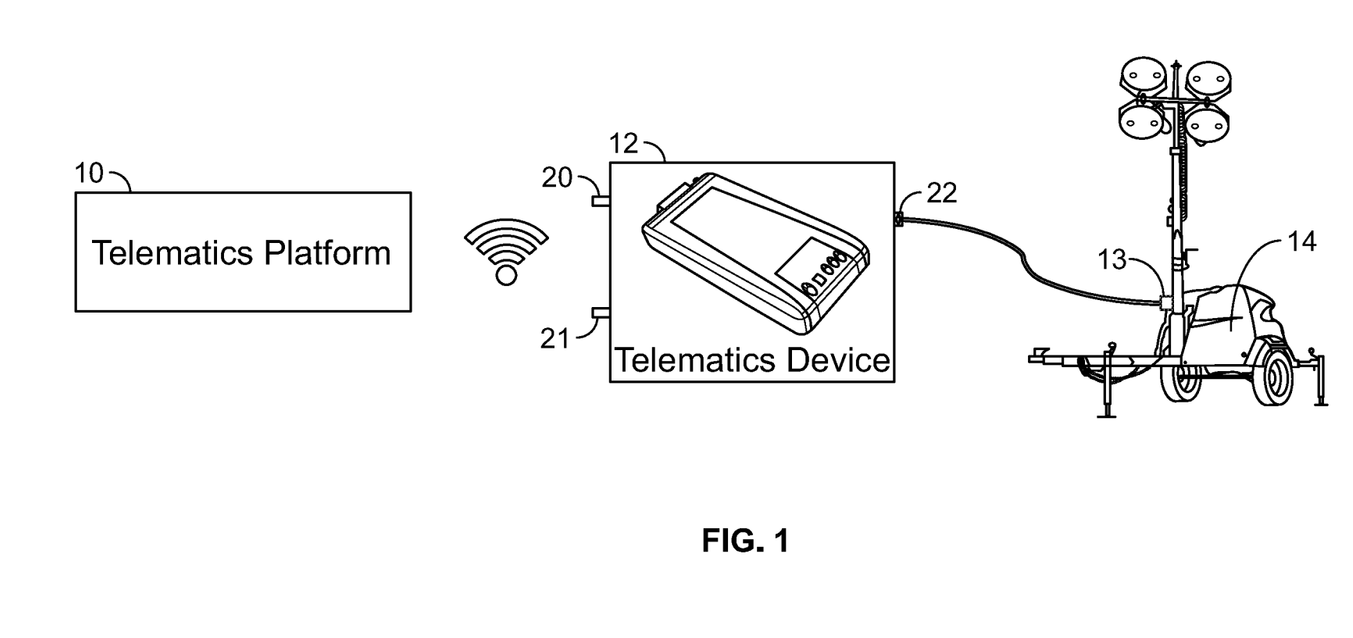
FIG. 1 is a diagram showing system components of the present invention according to one embodiment.

FIG. 1 shows the overall integration according to one example embodiment. FIG. 1 is a diagram illustrating components of a system 100 of the present invention according to one embodiment. In particular FIG. 1 shows a telematics platform 10 that communicates with a telematics device 12 that is integrated with a light tower unit 14. The system 100 can have one or many light tower units 14.

Accordingly, the light tower automation system 100 and method of the present invention includes the use of the telematics platform 10 to send User Datagram Protocol (UDP) messages over a cellular network (e.g., AT&T) to the telematics device 12 that is integrated with a light tower unit 14, to control the ON/OFF functionality of the light tower, among other functions.

As is well known in the art, the User Datagram Protocol (UDP) is one of the core members of the Internet protocol suite. With UDP, computer applications can send messages or datagrams to other hosts on an Internet Protocol (IP) network. Prior communications are not required in order to set up communication channels or data paths. UDP uses a simple connectionless communication model with a minimum of protocol mechanism. UDP provides checksums for data integrity, and port numbers for addressing different functions at the source and destination of the datagram. If error-correction facilities are needed at the network interface level, an application may use Transmission Control Protocol (TCP) or Stream Control Transmission Protocol (SCTP) which are designed for this purpose. It is of course to be understood that while UDP messages are used in a preferred embodiment, other types of messages may be used as well.

The telematics platform 10 sends out a UDP message over a cellular or wireless network to the telematics device 12 which may be placed on the light tower 14. The telematics device 12 is powered and connected to a controller or relay 13 within the light tower unit 14. The controller or relay 13 performs functions including controlling the turning on and off of the engine of the light tower unit 14.

When the light tower unit 14 is scheduled to be ON, the telematics platform 10 transmits a UDP message instructing the telematics device 12 to change the voltage output from Low to High. Upon receiving the UDP message containing the ON command from the telematics platform 10, the telematics device 12 then changes its voltage output to High, which in turn signals the light tower controller or relay 13 to turn on the diesel engine and start the light tower 14.

Similarly, when the light tower unit 14 is scheduled to be OFF, the telematics platform 10 transmits a UDP message instructing the telematics device 12 to change the voltage output from High to Low. Upon receiving the OFF command from the telematics platform 10, the telematics device 12 changes its output to Low, which signals the light tower controller to turn off the diesel engine and the whole light.

Further, upon receiving either an ON or an OFF command from the telematics platform 10, the telematics device 12 sends an acknowledgement message back to the telematics platform 10 confirming that the telematics device 12 received the message and that it is in a good cellular network. The telematics device 12 is programmed such that once the light tower 14 turns ON, the telematics device 12 sends a Locational Report the desired or predetermined interval (e.g., every 5 minutes). The Locational Report includes locational information as well as information about the equipment's health. The telematics device 12 can also send other reports as well. For example, in addition to the Locational Report, the telematics device 12 can also send Ignition ON and Ignition OFF reports, whenever such action is initiated.

Figure 10:
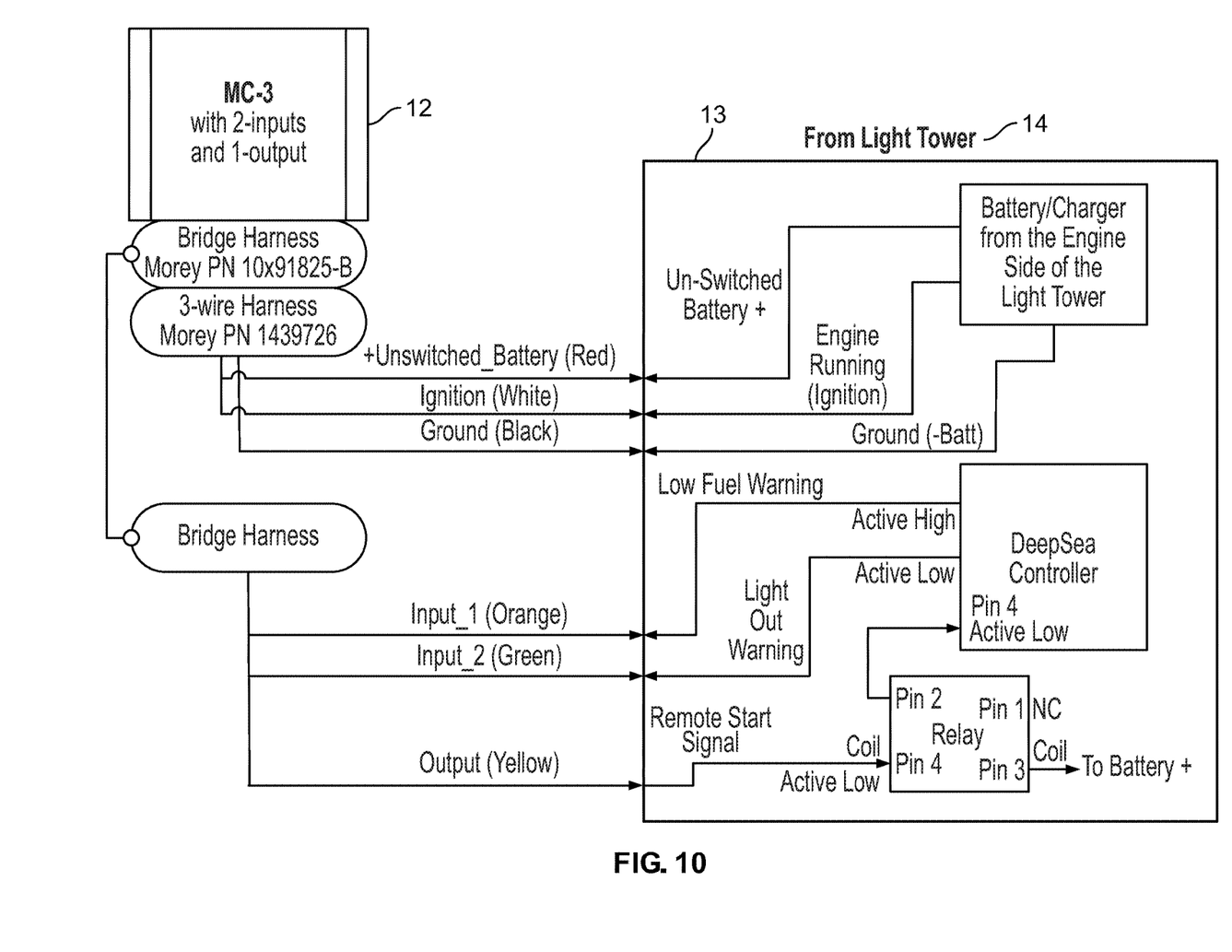
FIG. 10 is a diagram of the telematics device that conveys information to the light tower relay controller.

The telematics device 12 according to this embodiment has two input ports 20, 21 and one output port 22. The output port 22 is connected to the light tower relay controller 13 of a light tower unit 14, and is responsible for changing the voltage output to either High or Low based upon the UDP message received from the telematics box 12, as described above. ON and OFF UDP messages are persistent and only can be superseded by each other. The two input ports 20, 21 are used to obtain information about items such as the fuel level and any system alert on the light tower 14. The information is passed from the light tower unit 14 through the relay 13 to the telematics device 12 which passes the information to the telematics platform 10. The telematics device 12 receives signals and commands from the telematics platform 10 and sends control signals to the light tower unit 14 via the relay controller 13. The telematics device 12 generates periodic location reports at configurable periods. The location may be derived using GPS.

FIG. 10 is a diagram of the telematics device 12 that conveys information to the light tower relay controller 13. The telematics device 12 passes the information through the relay 13 to send the high low signal for ON/OFF.

Broadly, and as will be described in more detail below, the telematics platform 10 has dashboard controls for an administrator or user to interface with. The telematics platform 10 controls the system and the rest of the components, e.g., the telematics device 12 which controls the light tower 14. The telematics platform 10 generates reports from the data fed back from the telematics device 12 and makes decisions based on the reports, determines when to turn on and off each light tower 14, determines a schedule, and is a platform in which coding and software modules reside.

Figure 2:
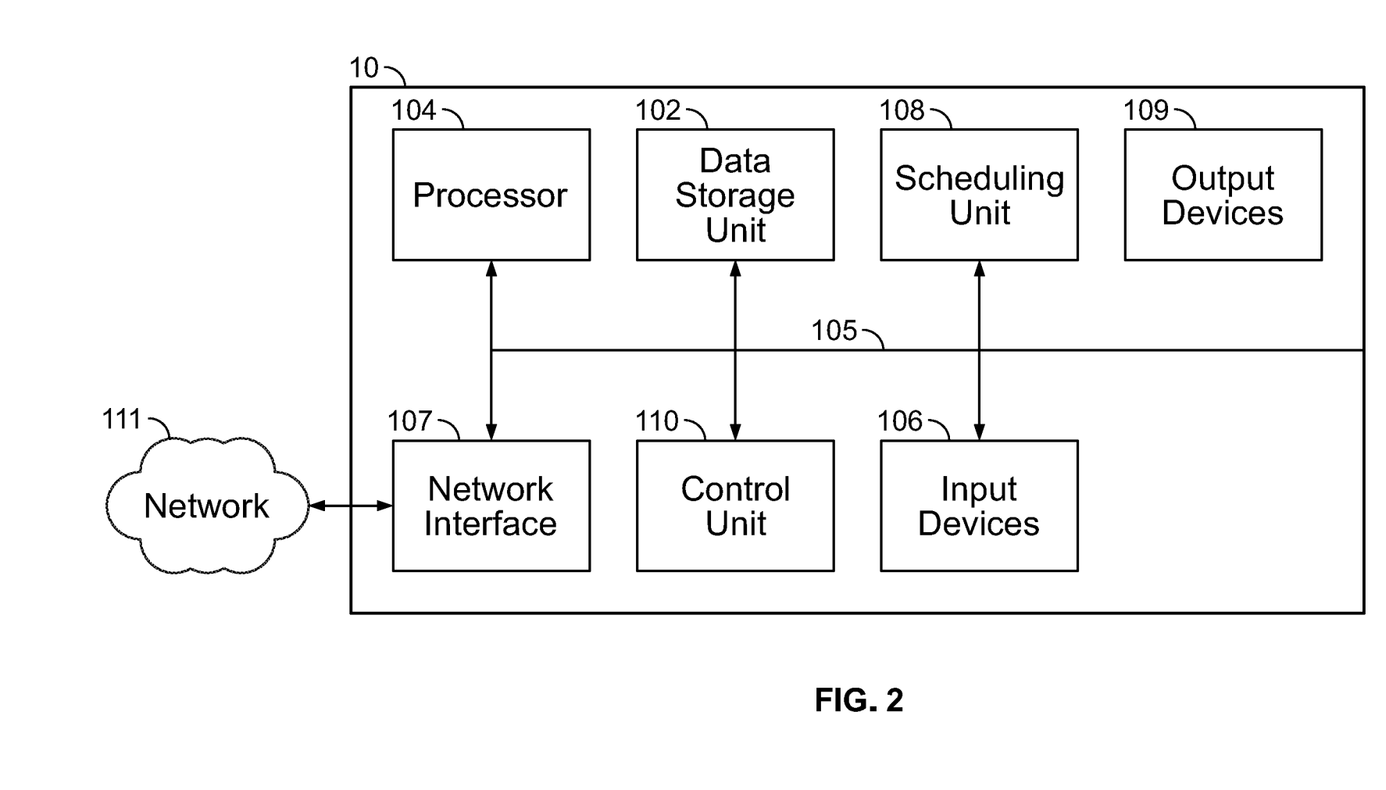
FIG. 2 is a block diagram of an example telematics platform in accordance with an example embodiment of the present invention.

FIG. 2 is a block diagram of an example telematics platform 10 in accordance with an example embodiment of the present invention.

The device 10 in FIG. 2 comprises a computer including a data storage unit 102 for storing data and at least one processor 104. In one embodiment, the telematics platform 10 is a standalone handheld computerized device or mobile device, but in other embodiments it may be a desktop computer or a server, etc. The telematics platform includes the data storage unit 102, the processor 104, and programmed instructions and algorithms (software, modules, and subroutines) for carrying out the functions of automated light tower control as described herein. With the telematics platform 10 a user or administrator can press the appropriate buttons or keystrokes and the telematics platform 10 carries out the functions dictated thereby. Of course, this is just an example and the present invention is not limited thereto.

The telematics platform 10 shown in FIG. 1 has a bus system 105 including, for example, a data bus and a motherboard, which can be used to establish and control data communications between the components 102, 104, 106, 107, 108, 109, and 110. The data storage unit 102 can receive and store data from the telematics device 12. The network interface 107 can interface with a wireless or cellular network device operable to communicate data to and from a network 111. The network 111 can be a cellular network or can include one or more local area networks (LANs) and/or a wide area network (WAN) such as the Internet. Other architectures can of course also be used.

The data storage unit 102 may be a hard drive or other computer readable media known in the art. The telematics platform 10 includes input devices 106 known in the art, including, e.g., a keypad (physical or virtual) or keyboard or other peripherals. Example output devices 109 include a display device, an audio device, etc.

The scheduling unit or scheduler 108 can create schedules (for example with programming input from the user) for controlling the ON/OFF status of the light towers 14. The scheduling unit 108 generates reports from the data fed back from the telematics device 12 (via the relay controller 13 on the light tower 14) and makes decisions based on the reports. The telematics platform 10 also has a control unit HO (which may itself include one or more processors) which can create ON/OFF signals based on communications received from the scheduling unit 108, to be sent to the telematics device 12 for controlling the ON/OFF status of the light towers 14. The light towers 14 can be controlled individually or as a group.

Figure 3:
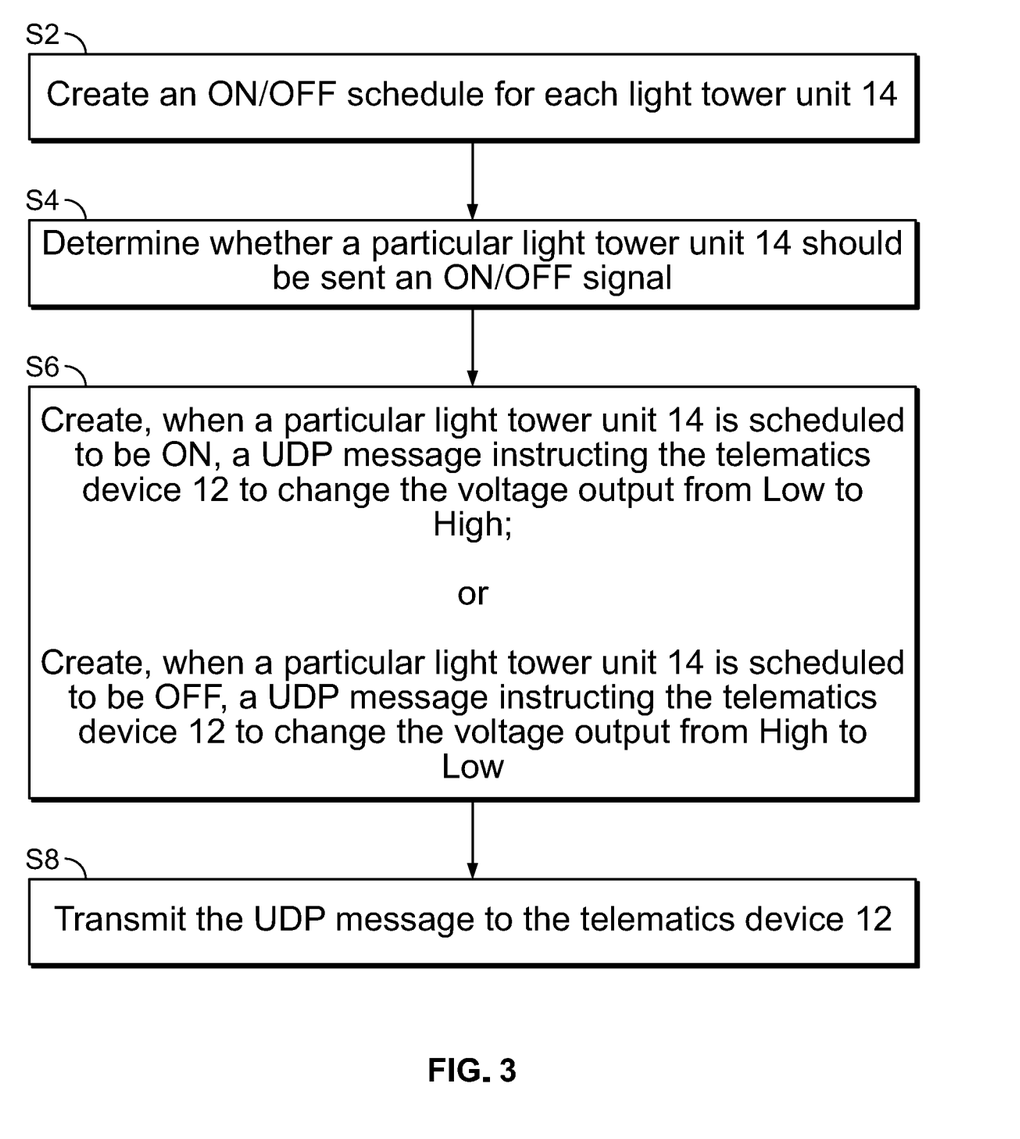
FIG. 3 is a flowchart showing an example aspect of the method steps carried out by the telematics platform according to the present invention for controlling ON/OFF status of a light tower.

FIG. 3 is a flowchart showing an example aspect of the method steps carried out by the telematics platform 10 according to the present invention for controlling ON/OFF status of a light tower 14. In step S2 the scheduling unit 108 creates an ON/OFF schedule for each light tower unit 14. In step S4 the control unit 110 receives the scheduling data from the scheduling unit 108 and based thereon determines whether a particular light tower unit 14 should be sent an ON/OFF signal. In step S6, when a particular light tower unit 14 is scheduled to be ON, the control unit 110 creates a UDP message instructing the telematics device 12 to change the voltage output from Low to High; similarly, when a particular light tower unit 14 is scheduled to be OFF, the control unit 110 creates a UDP message instructing the telematics device 12 to change the voltage output from High to Low. In step S8 the UDP message is transmitted through the network 111 to the telematics device 12, after which the light tower 14 is controlled as described in the description above. The method(s) of the present invention including the method of FIG. 3 can be embodied in a computer program stored in a non-transitory computer-readable medium, in a computer program product, in a signal, etc., when executed by one or more processors or by a computer, performs the method.

The data storage unit 102 can store data such as scheduling data and further can store an acknowledgement message sent from the telematics device 12, e.g., confirming that the telematics device 12 received the UDP message and that it is in a good cellular network. The data storage unit 102 can also store Locational Reports which can include locational information as well as information about the health of the light tower 14. The data storage unit 102 can also store other reports as well such as Ignition ON and Ignition OFF reports, whenever such action is initiated.

Attached below are screenshots of the scheduler of the telematics platform 10 that is used to the control the light tower(s) 14 according to example embodiments.

Figure 4:
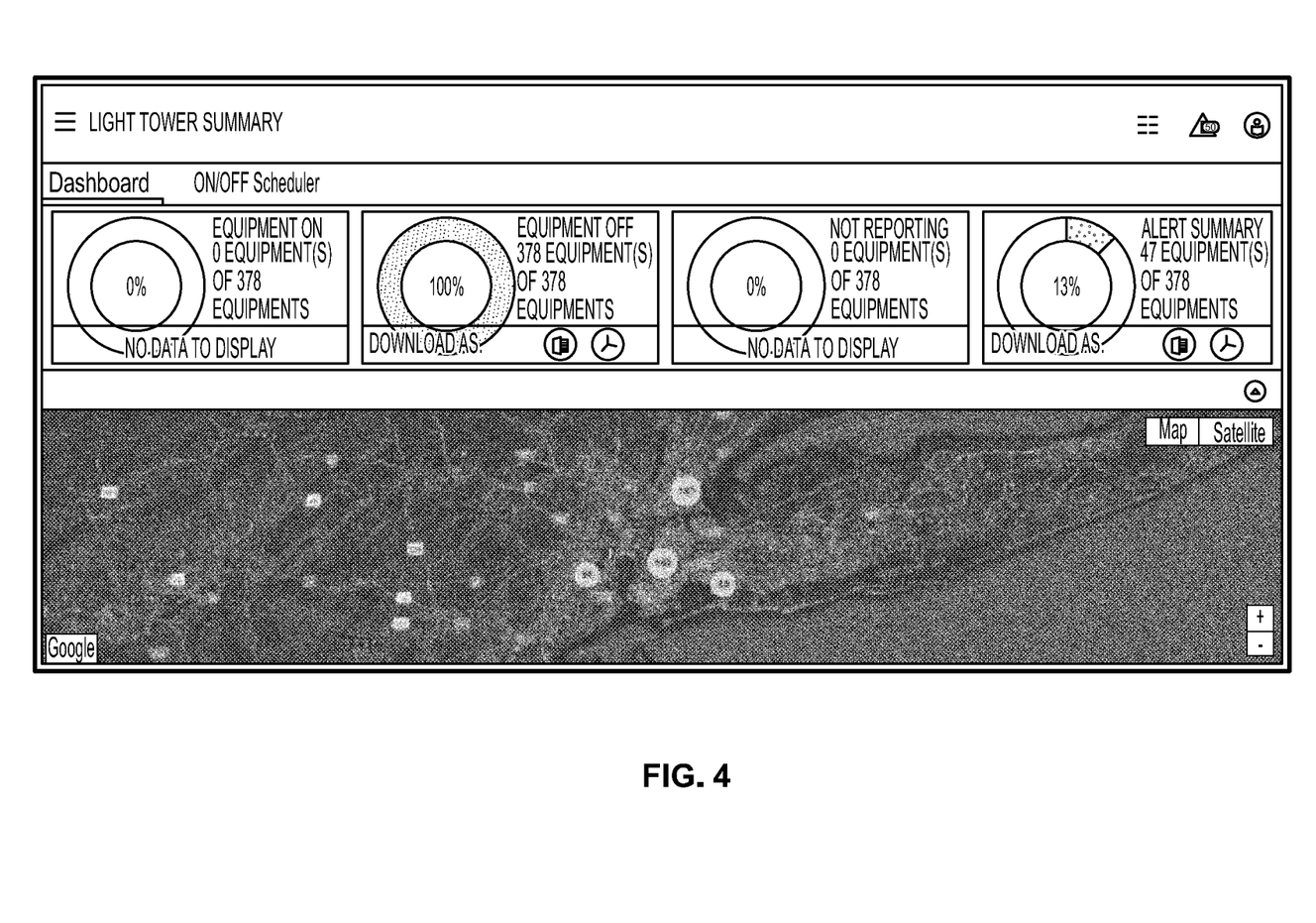
FIG. 4 is a screen shot showing an example of the light tower dashboard which gives an overview of all light towers in the field along with their current status (ON/OFF), equipment health (Alerts), and network coverage (Not Reporting).

FIG. 4 shows the light tower dashboard which gives an overview of all light towers 14 in field along with their current status (ON/OFF), equipment health (Alerts), and network coverage (Not Reporting). In this particular example, 0% of the light towers 14 are ON (0 of 378), and thus 100% of the light towers 14 are OFF (378 of 378). All of the light towers 14 are reporting (0% Not Reporting), and 13% of the light towers 14 have an alert of one category or another (47 of 378). This information is derived from each light tower controller, which obtains the information and sends the data to the respective telematics device 12 which transmits the data to the telematics platform 10. The equipment health may comprise factors such as wear and tear, damage, a light or bulb being out, etc. The bubbles or circles shown in the map of FIG. 4 for example are clusters on the map with the number of light towers 14 in that area. In practice as the user or administrator of the telematics platform 10 zooms in on the map shown on the dashboard, the clusters break apart further for more accurate locations.

Figure 5:
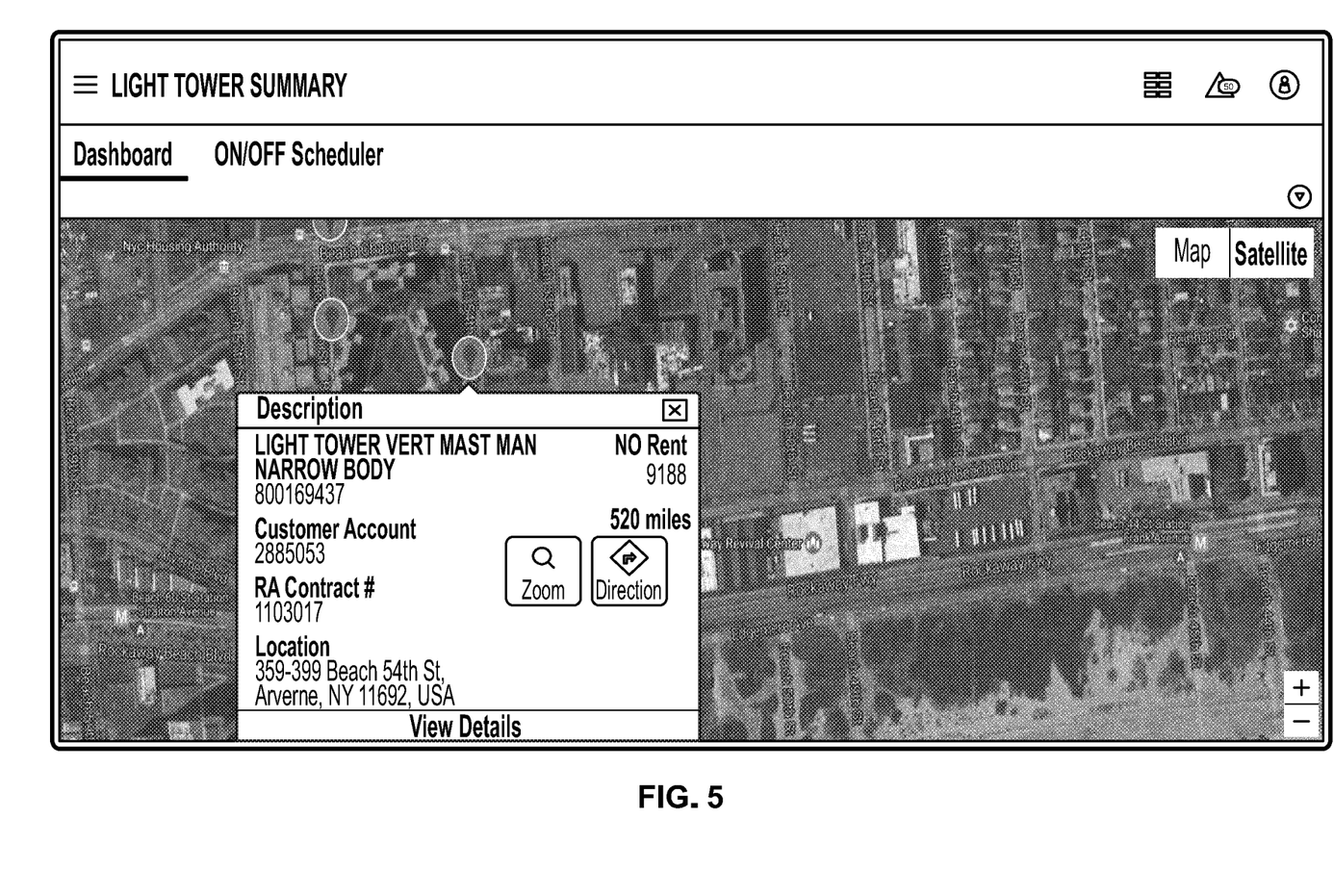
FIG. 5 is an example of a screen shot showing the street level location of the light tower along with the description of the light tower.

FIG. 5 is a screen shot of the scheduler showing an aerial photo of the street level location of the light towers in view along with a description of a particular light tower 14.

Figure 6:
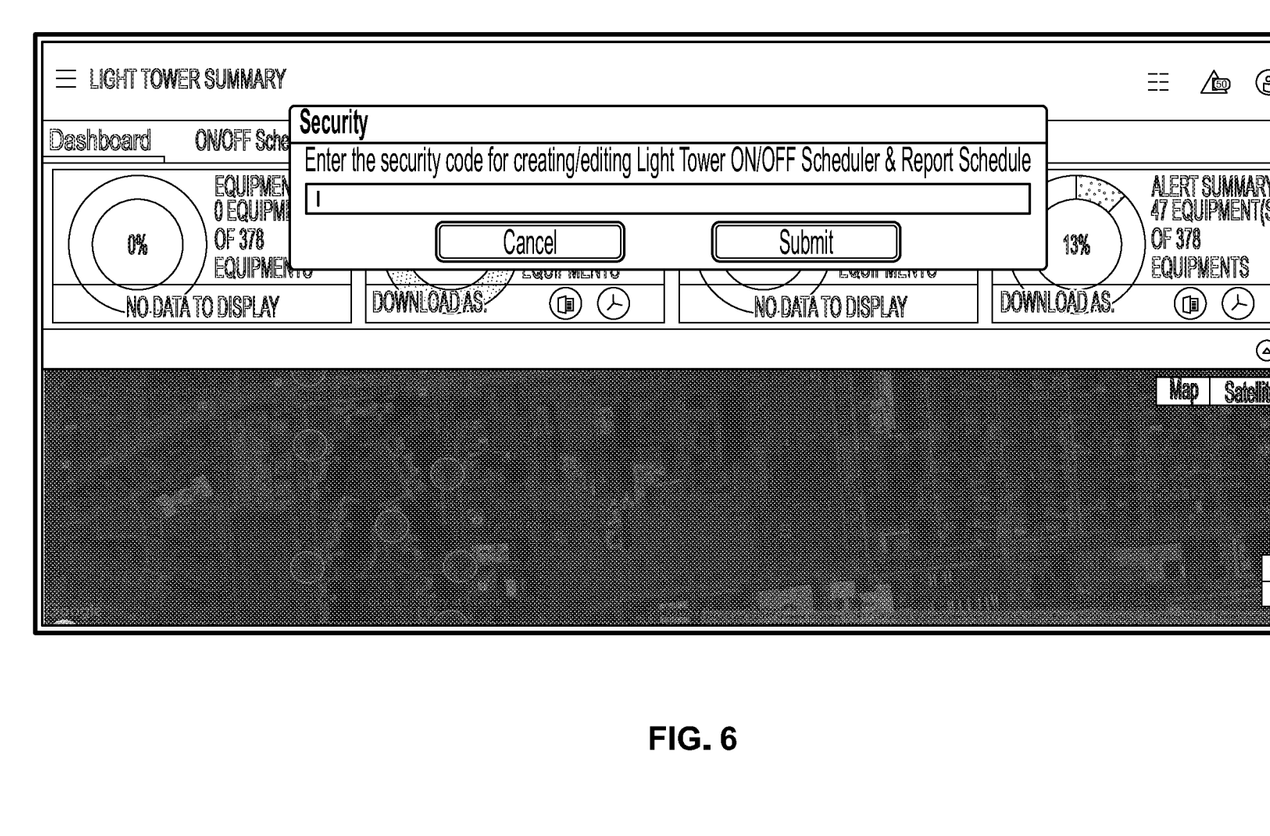
FIG. 6 is a screen shot showing the double authentication needed to schedule the lights to come ON or OFF.

FIG. 6 is a screen shot showing the double authentication needed to schedule the lights to come ON or OFF. The first level of authentication is the login information into the platform (e.g., username, password) and the second authentication is the security code. Once the double authentication is performed, the user can proceed to create and/or edit the light tower control such as ON/OFF and request or view various reports. Of course, other security and authentication methods may be used instead.

Figure 7:
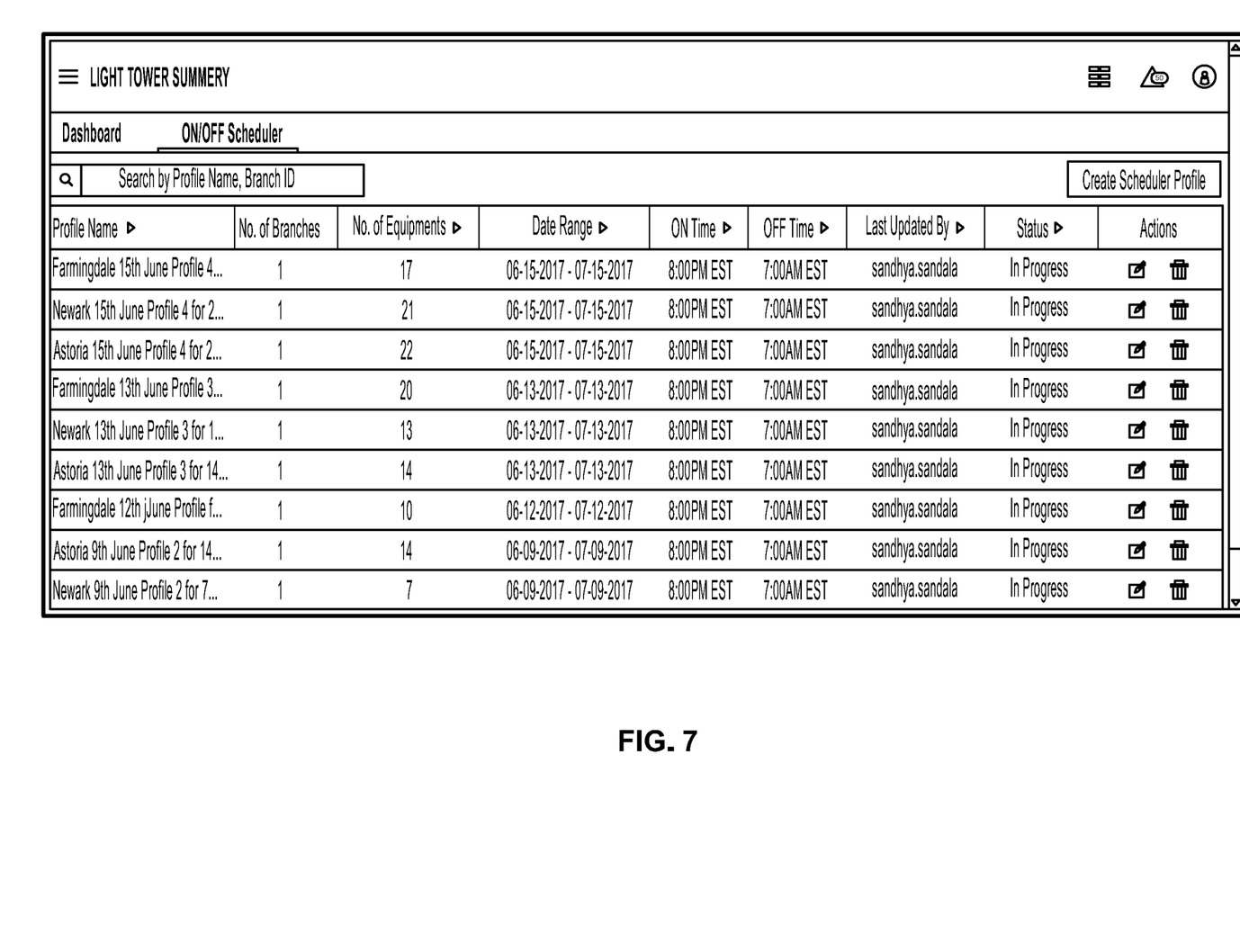
FIG. 7 is a screen shot showing existing schedules and properties related to that schedule.

FIG. 7 is a screen shot showing existing schedules and properties relates to that schedule. The dashboard shows locations, number of branches at that location, the number of equipments at that location, the date range, ON and OFF times, the name of the person who performed the last update, and the current status of each light tower (e.g., "In Progress"). Search capability is included such that the user may search by profile name, branch ID, etc.

Figure 8:
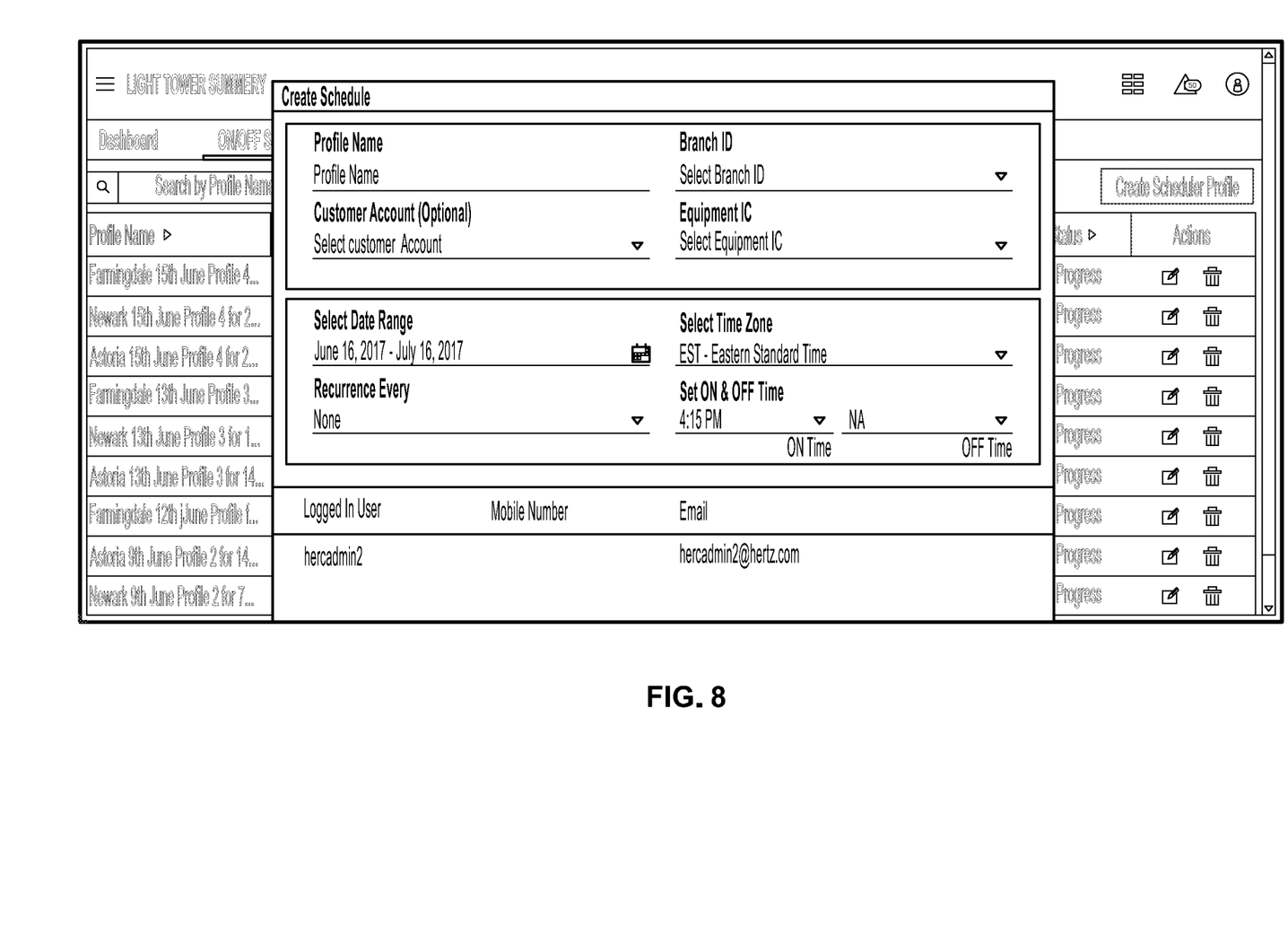
FIG. 8 is a screen shot showing the popup that can be used to create a new schedule.

FIG. 8 is a screen shot showing popup window from which a user can create a new schedule. The user or administrator enters such information as profile name, branch ID, Equipment IC, and customer account. The user can program a date range and select an ON and OFF time, and a recurrence interval (e.g., every X hours, or not at all). The user has the ability to create multiple schedules that define the time period for which the remotely enabled light towers 14, should be powered ON/OFF. The schedule can be edited/deleted based on its current execution status. The profile can be created for a selected group of remotely enabled light towers 14, or for all of the remotely enabled light towers 14 in the branches the user has selected. The system 100 has a schedule exception alert such that in cases of a schedule missed or a remote command failure to turn ON/OFF the equipment, an exception alert is triggered by the scheduling unit 108 of the telematics platform 10 by comparing the current ignition status of the light towers 14 with the ignition status set at the scheduled start time and on regular intervals until the scheduled end time.

Figure 9:
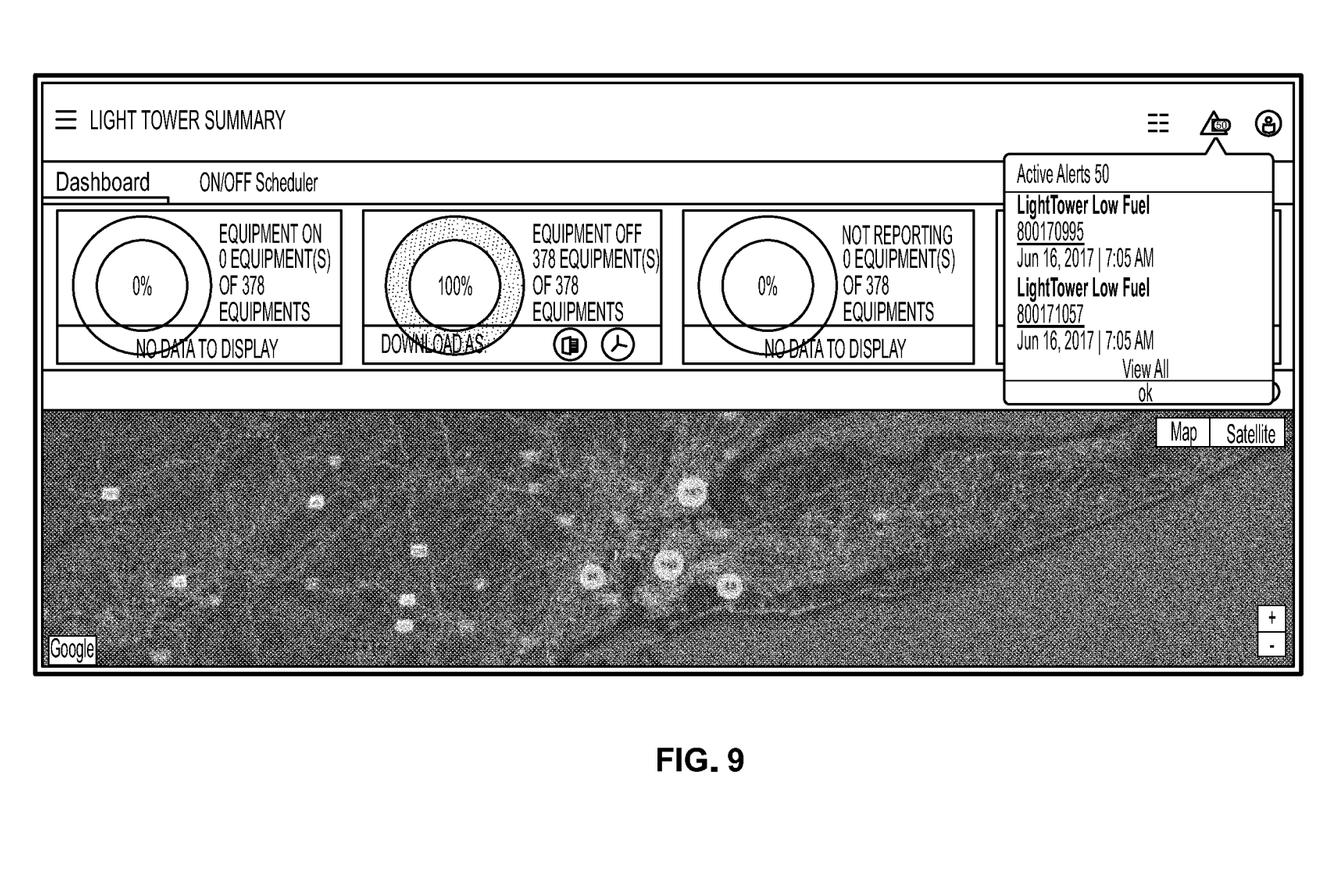
FIG. 9 is a screen shot showing a quick view of active alerts on the top right hand corner.

FIG. 9 is a screen shot showing a quick view of active alerts on the top right hand corner. In the example given two light towers (800170995 and 800171057) are low on fuel.

By virtue of the features of the present invention, the telematics platform (which in one embodiment is a web-based application) enables users and admins to rapidly identify and locate each unit, expedite movement, optimize utilization, and reduce security risks. All of these tools empower the user to focus on his or her day to day job and be alerted if an action is required.

There were a number of challenges that were overcome in designing the invention components such as the telematics platform 10, the telematics device 12, and the relay 13, and the present invention provides a number of features and advantages, as shown and described above and herein. Others include the following.

One design challenge was that there was a delay in getting the command at the light towers 14 due to low signal or Network Outage. The remedy designed by the applicant was that the present invention implements re-try logic for when the device (e.g., the telematics device 21) is not able to receive and acknowledge the message; the application (e.g., the telematics platform 10) keeps track of the data and re-sends the command up to a predetermined number of times, e.g., 3 times in a preferred embodiment.

Another design challenge was that unsolicited data packets were to be sent to the telematics device 12. The remedy designed by the applicant was that the PoC was performed to determine a secure way of transmitting unsolicited data packets to the telematics device 12 to enable the remote commands.

Another challenge was to turn ON/OFF light towers 14 during a non-scheduled time. The remedy designed by the applicant was that a command center tool was built (e.g., into the telematics platform 10) to enable users to send commands (single or bulk) to light towers 14, the commands being branch-specific or light tower-specific to turn them ON/OFF.

Although the invention has been described in the context of an exemplary embodiment involving light tower units, broadly construed, the invention is not so limited. In other embodiments the invention can be applied to many other applications including but not limited to controlling fans, air conditioning units, heating units, wind turbines, street lights, other equipments, etc.

Example Embodiment(s)

The present invention or any part(s) or function(s) thereof, including but not limited to the telematics platform 10, the telematics device 12, the light tower controller(s) or relay controllers(s) 13 may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures or screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures and screenshots.

The invention claimed is:

1. A system of for light tower control, comprising:
   a telematics platform, configured to transmit and receive a UDP message over a cellular network, a transmitted UDP message containing a control signal for turning ON or OFF a light tower; and
   a telematics device, configured to receive the UDP message and configure a voltage output of the telematics device based on the control signal,
   wherein if the control signal is ON the voltage output of the telematics device is changed from Low to High and if the control signal is OFF the voltage output of the telematics device is changed from High to Low, and
   wherein after the light tower is turned ON the telematics device sends a Locational Report to the telematics platform at a predetermined interval, the Locational Report including locational information and information about a health status of the light tower.

2. The system of claim 1, wherein a relay controller of the light tower turns the light tower ON if the voltage output of the telematics device is High and turns the light tower OFF if the voltage output of the telematics device is Low.

3. The system of claim 1, wherein the telematics device is configured to transmit an acknowledgment message back to the telematics platform confirming receipt of the UDP message.

4. A system for light tower control, comprising:
a telematics platform, configured to transmit and receive a UDP message over a cellular network, a transmitted UDP message containing a control signal for turning ON or OFF a light tower; and
a telematics device, configured to receive the UDP message and configure a voltage output of the telematics device based on the control signal,
wherein if the control signal is ON the voltage output of the telematics device is changed from Low to High and if the control signal is OFF the voltage output of the telematics device is changed from High to Low, and
wherein the telematics device has two input ports and one output port, wherein the output port has the voltage output and the input ports are used to obtain information from a relay controller of the light tower relating to fuel level and any system alerts.

5. The system of claim 4, wherein the relay controller of the light tower turns the light tower ON if the voltage output of the telematics device is High and turns the light tower OFF if the voltage output of the telematics device is Low.

6. The system of claim 4, wherein the telematics device is configured to transmit an acknowledgment message back to the telematics platform confirming receipt of the UDP message.

7. A system for light tower control, comprising:
a telematics platform, configured to transmit and receive a UDP message over a cellular network, a transmitted UDP message containing a control signal for turning ON or OFF a light tower; and
a telematics device, configured to receive the UDP message and configure a voltage output of the telematics device based on the control signal,
wherein if the control signal is ON the voltage output of the telematics device is changed from Low to High and if the control signal is OFF the voltage output of the telematics device is changed from High to Low,
wherein the telematics platform has a dashboard for enabling a user to interface with a scheduler of the telematics platform, and
wherein access to the scheduler is controlled by double authentication.

8. The system of claim 7, wherein a relay controller of the light tower turns the light tower ON if the voltage output of the telematics device is High and turns the light tower OFF if the voltage output of the telematics device is Low.

9. The system of claim 7, wherein the telematics device is configured to transmit an acknowledgment message back to the telematics platform confirming receipt of the UDP message.

10. A system for light tower control, comprising:
a telematics platform, configured to transmit and receive a UDP message over a cellular network, a transmitted UDP message containing a control signal for turning ON or OFF a light tower; and
a telematics device, configured to receive the UDP message and configure a voltage output of the telematics device based on the control signal,
wherein if the control signal is ON the voltage output of the telematics device is changed from Low to High and if the control signal is OFF the voltage output of the telematics device is changed from High to Low, and
wherein the telematics platform generates reports from the data fed back from the telematics device and determines a schedule for controlling ON/OFF status of the light tower based on the reports.

11. The system of claim 10, wherein a relay controller of the light tower turns the light tower ON if the voltage output of the telematics device is High and turns the light tower OFF if the voltage output of the telematics device is Low.

12. The system of claim 10, wherein the telematics device is configured to transmit an acknowledgment message back to the telematics platform confirming receipt of the UDP message.

13. A telematics platform for light tower control, comprising:
a scheduling unit, configured to create an ON/OFF schedule for a light tower unit;
a control unit, configured to determine whether the light tower unit is scheduled to be ON or OFF based on the schedule and create a control signal based thereon; and
a network interface, configured to transmit a message over a cellular network which contains the control signal for turning ON or OFF the light tower,
wherein the telematics platform is configured to receive a Locational Report including locational information and information about a health status of the light tower unit.

14. The telematics platform of claim 13, wherein the message is a UDP message.

15. A telematics platform for light tower control, comprising:
a scheduling unit, configured to create an ON/OFF schedule for a light tower unit;
a control unit, configured to determine whether the light tower unit is scheduled to be ON or OFF based on the schedule and create a control signal based thereon;
a network interface, configured to transmit a message over a cellular network which contains the control signal for turning ON or OFF the light tower; and
a dashboard for enabling a user to interface with a scheduler of the telematics platform to program a schedule for the light towers including on/off time, recurrence pattern, and length of pattern,
wherein access to the scheduler is controlled by double authentication.

16. The telematics platform of claim 15, wherein the message is a UDP message.

17. A telematics platform for light tower control, comprising:
a scheduling unit, configured to create an ON/OFF schedule for a light tower unit;
a control unit, configured to determine whether the light tower unit is scheduled to be ON or OFF based on the schedule and create a control signal based thereon;
a network interface, configured to transmit a message over a cellular network which contains the control signal for turning ON or OFF the light tower; and
a dashboard for enabling a user to interface with a scheduler of the telematics platform to program a schedule for the light towers including on/off time, recurrence pattern, and length of pattern,
wherein the dashboard presents an overview of all light tower units along with current status, health alerts, and network coverage thereof.

18. The telematics platform of claim 17, wherein the message is a UDP message.

19. A telematics platform for light tower control, comprising:
- a scheduling unit, configured to create an ON/OFF schedule for a light tower unit;
- a control unit, configured to determine whether the light tower unit is scheduled to be ON or OFF based on the schedule and create a control signal based thereon; and
- a network interface, configured to transmit a message over a cellular network which contains the control signal for turning ON or OFF the light tower,
- wherein the telematics platform generates reports from the data received from a telematics device and determines a schedule for controlling ON/OFF status of the light tower based on the reports.

20. The telematics platform of claim 19, wherein the message is a UDP message.

* * * * *